US006779839B2

(12) United States Patent
Andreasson et al.

(10) Patent No.: US 6,779,839 B2
(45) Date of Patent: Aug. 24, 2004

(54) FLIP HEAD RESTRAINT

(75) Inventors: Bengt Andreasson, Uddevalla (SE);
Carina Stridsberg, Uddevalla (SE);
Christer Andersson, Trollhättan (SE);
Odd Jaegtnes, Lödöse (SE); Lennart Nyström, Trollhättan (SE)

(73) Assignee: LEAR Corporation, Southfield, MI (US)

( * ) Notice: Subject to any disclaimer, the term of this patent is extended or adjusted under 35 U.S.C. 154(b) by 0 days.

(21) Appl. No.: 10/278,604

(22) Filed: Oct. 23, 2002

(65) Prior Publication Data

US 2003/0098596 A1 May 29, 2003

Related U.S. Application Data

(60) Provisional application No. 60/335,671, filed on Oct. 23, 2001.

(51) Int. Cl.[7] ................................................ A47C 1/036
(52) U.S. Cl. ........................ 297/61; 297/408; 297/410
(58) Field of Search ................................. 297/408, 410, 297/61, 378.12

(56) References Cited

U.S. PATENT DOCUMENTS

| 5,669,668 | A | | 9/1997 | Leuchtmann |
| 5,681,079 | A | | 10/1997 | Robinson |
| 5,738,411 | A | | 4/1998 | Sutton et al. |
| 5,826,942 | A | | 10/1998 | Sutton et al. |
| 6,000,759 | A | | 12/1999 | Pedronno et al. |
| 6,050,633 | A | | 4/2000 | Droual |
| 6,074,010 | A | * | 6/2000 | Takeda ................... 297/410 X |
| 6,074,011 | A | * | 6/2000 | Ptak et al. .............. 297/408 X |
| 6,129,421 | A | | 10/2000 | Gilson et al. |
| 6,192,565 | B1 | | 2/2001 | Tame |
| 6,193,317 | B1 | * | 2/2001 | Mitschelen et al. . 297/378.12 X |
| 6,485,096 | B1 | * | 11/2002 | Azar et al. ................ 297/61 X |

* cited by examiner

Primary Examiner—Anthony D. Barfield
(74) Attorney, Agent, or Firm—Bill C. Panagos

(57) ABSTRACT

A passenger seat having a seat back with a head restraint, the seat back pivotally attached to a seat cushion or a floor of a vehicle. When the seat back is folded down, the head restraint pivots up to allow the seat back to lay generally horizontal on the seat cushion thereby maximizing storage space without it contacting a front passenger seat.

17 Claims, 2 Drawing Sheets

FLIP HEAD RESTRAINT

CROSS-REFERENCE TO RELATED APPLICATIONS

This application claims the benefit of U.S. provisional application Ser. No. 60/335,671 filed Oct. 23, 2001.

BACKGROUND OF THE INVENTION

1. Field of the Invention

The present invention relates to vehicle passenger seats and, in particular, to a fold down vehicle passenger seat equipped with a flip head restraint.

2. Background Art

In many vehicles, such as station wagons, minivans, and sport utility vehicles, the rear passenger seats have seat backs which are designed to be folded down for increased vehicular storage capacity. Higher end vehicles generally have seat backs with adjustable head restraints which help protect the occupants in case of a collision. The seat back is generally pivotally mounted at its lower end to a seat cushion or a vehicle floor for rotation between an upright "use" position and a folded down "storage" position for increased storage. In some designs, the seat back is folded on top of the seat cushion. In other vehicles, the seat cushion folds up and the seat back folds into the space previously occupied by the seat cushion. However, the storage space may not be fully maximized because a rear passenger seat back having a head restraint cannot be folded to a generally horizontal position since the head restraint interferes with either the seat cushion or the back of the front passenger seat back.

Accordingly, it is desirable to have a seat back with a flip head restraint that allows the seat back to be folded to a generally horizontal position to maximize storage without contacting the front passenger seat.

SUMMARY OF THE INVENTION

An object of this invention is to provide a pivotally folding passenger seat having a head restraint that maximizes storage space in a vehicle when folded.

Accordingly, this invention provides a passenger seat having a seat cushion pivotally attached to a seat back having a flip head restraint. When the seat back is moved from its "use" or upright position to its folded or storage position, the flip head restraint flips up such that the seat back can be folded generally horizontal and the flip head restraint does not extend above the folded seat back.

The above objects and other objects, features, advantages of the present invention are readily apparent from the following description of the best modes for carrying out the invention when taken in connection with the accompanying drawings.

DETAILED DESCRIPTION OF THE PREFERRED EMBODIMENT(S)

Figures 1, 3:
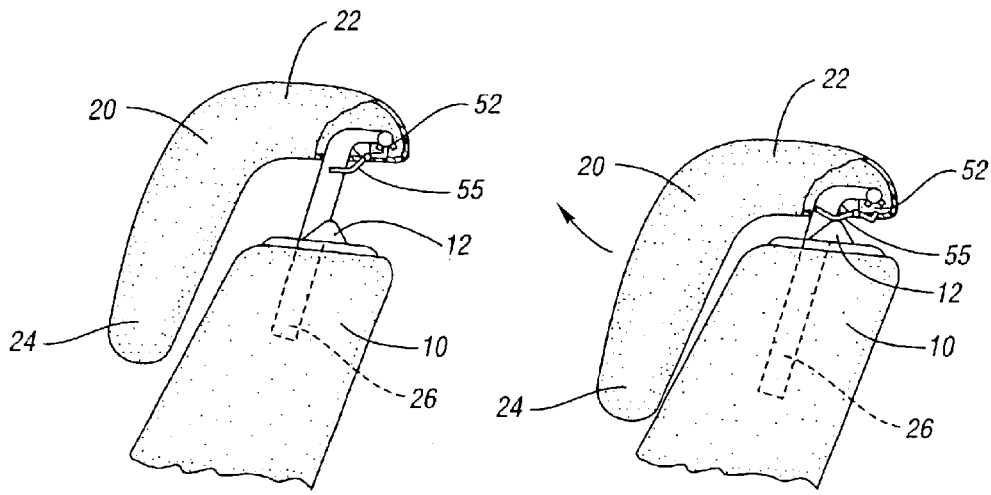
FIG. 1 is a side view of a flip head restraint of the present invention in its use position.
FIG. 3 is a side view of the flip head restraint in its retracted position.
Figure 2:
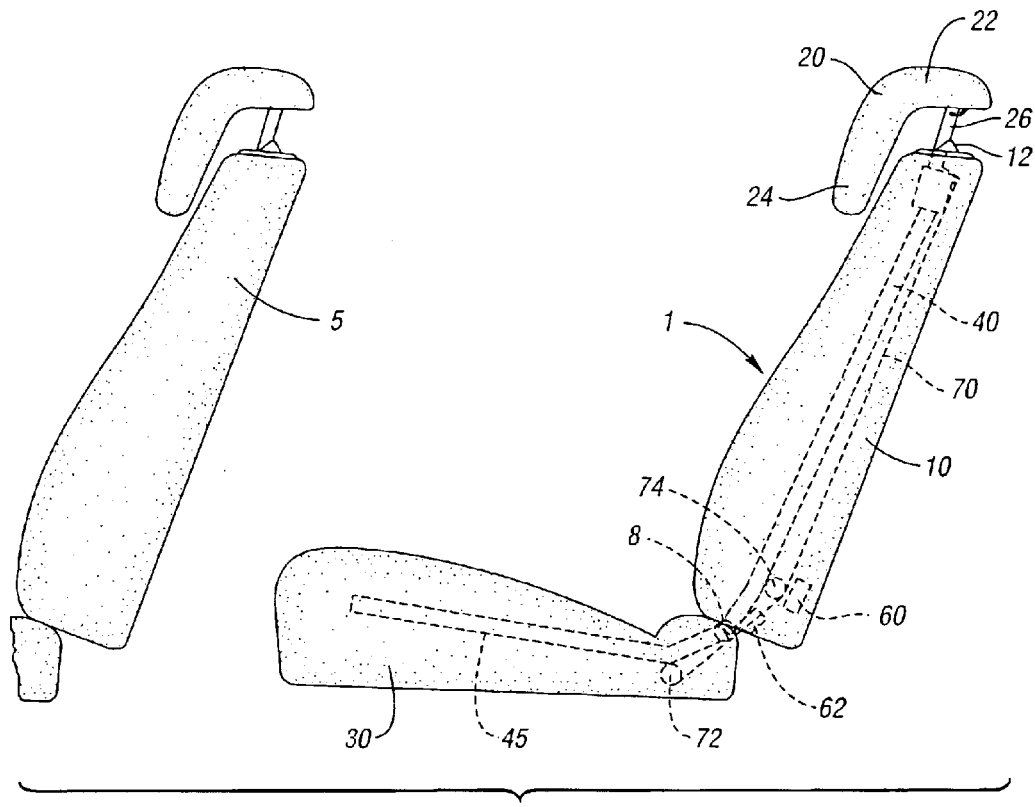
FIG. 2 is a side view of a passenger seat having the flip head restraint of the present invention in an upright use position.

Referring now to FIGS. 1 and 2, a rear passenger seat 1 having a seat back 10 is shown in an upright or "use" position to allow for passenger seating. A portion of a front passenger seat 5 is shown. This disclosure generally refers to a rear passenger seat 1 although the invention could equally apply to other seats such as a front passenger seat or a third seat. Seat back frame 40 is pivotally connected at pivot 8 to seat cushion frame 45 to allow the seat back 10 to pivot from the upright or "use" position (shown in FIG. 2) to a folded position (shown in FIG. 4). Alternatively, the seat back 10 can be pivotally attached directly to a vehicle floor or any other structure. The seat back 10, seat back frame 40, seat cushion 30, seat cushion frame 45, and the pivot 8 are of a structure known to those skilled in the art and therefore, their structure will not be further discussed.

Figure 4:
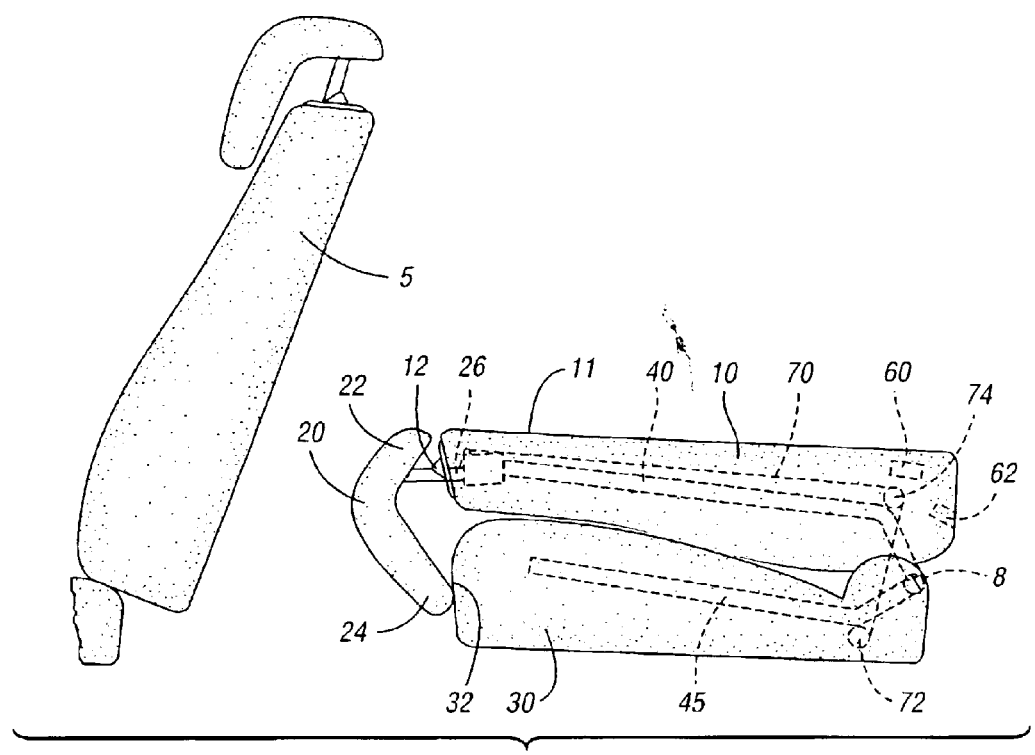
FIG. 4 is a side view of a passenger seat having the flip head restraint in its storage position.

Flip head restraint 20 is attached to seat back 10 or seat back frame 40 using at least one extension tube 26 to allow vertical adjustment of the flip head restraint 20 relative to the seat back 10 using known methods such as, but not limited to a motorized system, a friction fit, gears, or a mechanical latch. As shown in the drawings, flip head restraint 20 may comprise a generally horizontal portion 22 and a generally vertical portion 24 when seat back 10 is in its upright "use" position. When the seat back 10 is folded (as shown in FIG. 4), the generally horizontal portion 22 and the generally vertical portion 24 may have different inclinations. The top of extension tube 26 pivotally connects to the flip head restraint 20 in a known manner to allow it to pivot from its "use" position (shown in FIGS. 1 and 2) to its storage position (shown in FIG. 4). A latch 52 normally maintains the flip head restraint 20 in its "use" or down position. As is known in the art, the latch 52 may be on the extension tube 26 or the head restraint 20. A release lever 55 attached to the latch 52 disengages the latch 52 allowing the flip head restraint 20 to flip up to its storage position. A spring 54 (shown in FIG. 5) biases the flip head restraint 20 to its storage position. The release lever 55 can be triggered either manually or automatically when the flip head restraint 20 is lowered onto protrusion 12 on seat back 10 as described below. Alternatively, a solenoid could be used to remotely release the release lever 55.

Before the seat back 10 can be folded down, head restraint 20 may need to be lowered to minimize space and avoid interference with the front passenger seat 5. This can be accomplished using either an electric motor 56 or manually.

Referring now to FIG. 3, when the flip head restraint 20 is lowered beyond the normal use range either manually or automatically, protrusion 12 contacts the release lever 55 thereby releasing latch 52 which causes the spring 54 to bias the flip head restraint 20 to its storage position. The protrusion may be a portion of the seat back frame 40 or some other internal or external structure. Preferably, the flip head restraint will be automatically released at a specific, predetermined point during the folding on the seat back 10 to prevent interference with the front passenger seat 5.

Referring now to FIG. 4, the seat back 10 can now be folded down on top of the seat cushion 30 such that the generally vertical portion 24 of the flip head restraint is positioned proximate the front surface 32 of the seat cushion 30. The back surface 11 of seat back 10 is now in a generally horizontal plane and the flip head restraint 20 does not extend above that plane. There is also some clearance between head restraint 20 and front passenger seat 5.

As the seat back 10 is folded down, extension tube 26 may automatically extend upwards to give the flip head restraint 20 some clearance in its stored position to clear the seat cushion 30. This can be accomplished using electrical motors and drivers 50 or mechanical means.

Figure 5:
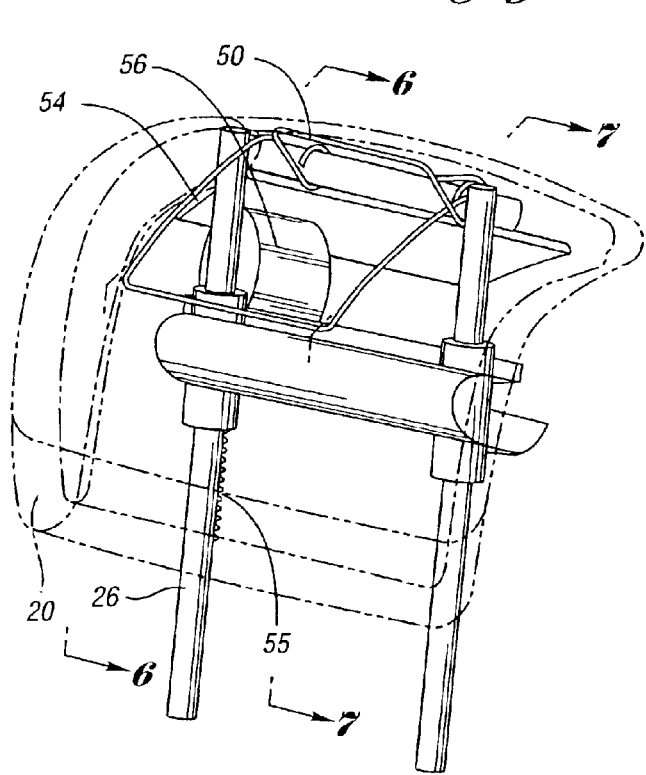
FIG. 5 is a front perspective phantom view of the flip head restraint showing the supporting structure.

Referring now to FIG. 5, the flip head restraint 20 is shown in a front perspective phantom view. Preferably, extension tubes 26 anchor the flip head restraint 20 to structure in the seat back 10 or seat back frame 40 using known methods. The flip head restraint 20 may be connected using one or more extensions tubes 26. Preferably, two extension tubes 26 are used. At least one extension tube 26 may have ratchet, teeth, or threads 55 to cooperate with electric motor 56 to adjust and lock and the flip head restraint 20 in a vertical position. A manual latch may also be used to adjust the height of the flip head restraint 20. Spring 54 biases the flip headrest upwards to a predetermined angular position when latch 52 is released and the seat back is folded down. Overload spring 50 counters the spring 54 to provide protection to the head restraint 20 and give it some flexibility.

Figure 6:
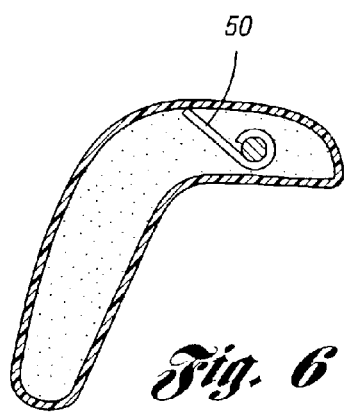
FIG. 6 is a cross-sectional view of the head restraint through a biasing spring.
Figure 7:
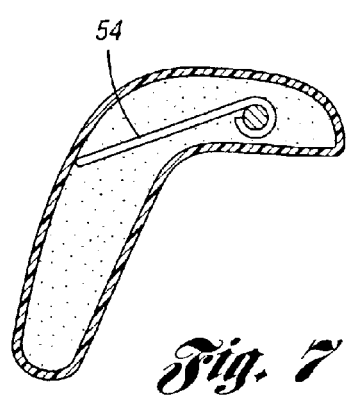
FIG. 7 is a cross-sectional view of the head restraint through an overload spring.

FIGS. 6 and 7 are cross-sectional views of the head restraint 20 showing springs 54 and 50, respectively. The springs may be hidden inside the head restraint 20 (as shown in FIGS. 6 and 7) or visible from the outside (as shown in FIG. 5).

As shown in FIGS. 2 and 4, seat back release 60 may release seat back latch 62 allowing seat back 10 to pivot using known methods.

To return the seat back 10 to its use position, the seat back 10 is manually pivoted upright preferably until seat back latch 62 locks the seat back 10 in the upright position. If not already extended, the electric motor 56 automatically moves the head restraint 20 upward a few millimeters to clear the protrusion 12 and allow the latch 52 to secure the flip head restraint 20 in its use position. The flip head restraint 20 is then manually flipped down into its latched "use" position. Alternatively, the head restraint can automatically be returned to the latched position using an electric motor or other mechanical means.

When the seat back latch 62 is released allowing the seat back 10 to pivot forward, the head restraint 20 may start to move down. This can be done using the electric motor 56 or mechanically by means of a connector 70 such as a tensioned rod or cable. When lowered sufficiently, protrusion 12 contacts the release lever and automatically causes the head restraint 20 to pivot.

Referring now to FIGS. 2 and 4, the use of a cable or tensioning device 70 to automatically trigger the lowering of the flip head restraint 20 is shown. The cable 70 is anchored at lower anchor 72 in seat cushion 30. If the seat back is pivotally attached directly to the floor of the vehicle, the anchor may be attached to the floor. The upper end of the cable 70 can either be attached to an electrical switch (not shown) or extension tube 26. A tensioner 74 is positioned such that as the seat back 10 is folded from its use position, cable 70 is tensioned and either contacts the electrical switch (not shown) or manually brings flip restraint 20 down until it contacts protrusion 12 and releases the flip head restraint 20.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising:

a seat back pivotable from a seat back upright use position to a seat back storage position;

a head restraint;

a flipping device connecting the head restraint to the seat back, the flipping device allowing the head restraint to be pivotable from a head restraint use position to a head restraint storage position, the flipping device comprising a spring mechanism biasing the head restraint toward the storage position; and an overload spring to bias the head restraint towards its use position to provide flexibility to the head restraint.

2. The seat assembly of claim 1 further comprising a latch proximate the head restraint to releasably secure the head restraint in its use position.

3. The seat assembly of claim 2 further comprising a protrusion on the seat back and wherein the latch is releasable by lowering the head restraint until the protrusion contacts the latch.

4. The seat assembly of claim 3 further comprising a connector, the connector being anchored at one end and attached to the head restraint at the other end wherein as the seat back is pivoted from its upright use position to its storage position, the connector pulls the head restraint towards the seat back and onto the protrusion so that the head restraint is released from its position.

5. The seat assembly of claim 3 further comprising a connector, the connector being anchored at one end and attached to an electric motor on the other end wherein as the seat back is pivoted from its upright use position to its storage position, the connector turns on the electric motor which moves the head restraint towards the seat back and onto the protrusion so that the head restraint is released from its use position.

6. A seat assembly comprising a seat back pivotable from a seat back upright use position to a seat back folded storage position, the seat back having at least one extension tube extending therefrom;

a head restraint pivotably attached to the at least one extension tube, the extension tube extendable and retractable into the seat back, the head restraint pivotable between a head restraint use position and a head restraint storage position;

a spring biasing the head restraint towards its storage position;

a latch on the at least one extension tube to releasably secure the head restraint in its use position; and a protrusion on the seat back, the protrusion adapted to release the latch on the extension tube when the extension tube is retracted into the seat back.

7. The seat assembly of claim 6 further comprising a connector, the connector being anchored at one end and attached to the head restraint at the other end wherein as the seat back is pivoted from its upright use position to its storage position, the connector pulls the head restraint towards the seat back and onto the protrusion so that the head restraint is released from its position.

8. The seat assembly of claim 6 further comprising a connector, the connector being anchored at one end and attached to an electric motor on the other end wherein as the seat back is pivoted from its upright use position to its storage position, the connector turns on the electric motor which moves the head restraint towards the seat back and onto the protrusion so that the head restraint is released from its use position.

9. The seat assembly of claim 1 further comprising:

a latch on the head restraint to releasably secure the head restraint in its use position; and a protrusion on the seat back, the protrusion adapted to release the latch on an extension tube when the extension tube is retracted into the seat back.

10. The seat assembly of claim 9 further comprising a motor to lower the head restraint relative to the seat back.

11. The seat assembly of claim 9 further comprising a connector, the connector being anchored at one end and attached to the head restraint at the other end wherein as the seat back is pivoted from its upright use position to its storage position, the connector pulls the head restraint towards the seat back and onto the protrusion so that the head restraint is released from its position.

12. The seat assembly of claim 9 further comprising a connector, the connector being anchored at one end and attached to an electric motor on the other end wherein as the seat back is pivoted from its upright use position to its storage position, the connector turns on the electric motor which moves the head restraint towards the seat back and onto the protrusion so that the head restraint is released from its use position.

13. A method of folding an automotive seat, the method comprising:

providing a seat back pivotable from an upright use position to a storage position, the seat back having a protrusion extending therefrom, a head restraint, and a flipping device connecting the head restraint to the seat back, the flipping device allowing the heat restraint to be pivotable from a use position to a storage position, the flipping device comprising a spring mechanism biasing the head restraint toward the heat restraint storage position;

pivoting the seat back forward; and lowering the head restraint toward the flipping device to contact the protrusion extending from the seat back thereby releasing the spring mechanism and allowing the head restraint to pivot from its use position to its storage position.

14. A seat assembly comprising:

a seat back pivotable from a seat back upright use position to a seat back storage position;

a head restraint pivotable from a head restraint use position to a head restraint storage position;

a flipping device connecting the head restraint to the seat back, the flipping device allowing the head restraint to be pivotable from the head restraint use position to the head restraint storage position;

a latch for releasably securing the head restraint in the head restraint use position; and a protrusion that operates to release the latch when the head restraint contacts the seat back.

15. A seat assembly comprising:

a seat back pivotable from a seat back upright use position to a seat back storage position;

a head restraint;

a flipping device connecting the head restraint to the seat back, the flipping device allowing the head restraint to be pivotable from a head restraint use position to a head restraint storage position, the flipping device comprising a spring mechanism biasing the head restraint toward the storage position; and a seat cushion pivotally connected to the seat back, the seat back being disposed over the seat cushion in a generally horizontal manner when the seat back is in the seat back storage position.

16. A seat assembly comprising:

a seat back pivotable from a seat back upright use position to a seat back storage position;

a head restraint; and a flipping device connecting the head restraint to the seat back, the flipping device allowing the head restraint to be pivotable from a head restraint use position to a head restraint storage position, the flipping device comprising a spring mechanism biasing the head restraint toward the storage position;

a latch to releasably secure the head restraint in its use position; and a protrusion on the seat back and wherein the latch is releasable by lowering the head restraint until the protrusion contacts the latch.

17. A seat assembly comprising a seat back pivotable from a seat back upright use position to a seat back folded storage position, the seat back having at least one extension tube extending therefrom;

a head restraint pivotably attached to the at least one extension tube, the extension tube extendable and retractable into the seat back, the head restraint pivotable between a head restraint use position and a head restraint storage position;

a spring biasing the head restraint towards its storage position;

a latch to releasably secure the head restraint in its use position; and a protrusion on the seat back, the protrusion adapted to release the latch on the extension tube when the extension tube is retracted into the seat back.

* * * * *